US012765546B2

(12) United States Patent
Sagliano et al.

(10) Patent No.: US 12,765,546 B2
(45) Date of Patent: Oct. 20, 2026

(54) PELARGONIC ACID-BASED HERBICIDE COMPOSITIONS

(71) Applicant: NOVAMONT S.P.A., Novara (IT)

(72) Inventors: Angela Sagliano, Milan (IT); Anna Ciancolini, Terni (IT); Luigi Capuzzi, Novara (IT)

(73) Assignee: NOVAMONT S.P.A., Novara (IT)

( * ) Notice: Subject to any disclaimer, the term of this patent is extended or adjusted under 35 U.S.C. 154(b) by 817 days.

(21) Appl. No.: 17/904,434

(22) PCT Filed: Feb. 18, 2021

(86) PCT No.: PCT/EP2021/054050

§ 371 (c)(1),
(2) Date: Aug. 17, 2022

(87) PCT Pub. No.: WO2021/165411

PCT Pub. Date: Aug. 26, 2021

(65) Prior Publication Data

US 2023/0079789 A1 Mar. 16, 2023

(30) Foreign Application Priority Data

Feb. 21, 2020 (IT) ........................ 102020000003635

(51) Int. Cl.

| | |
|---|---|
| ***A01N 37/02*** | (2006.01) |
| ***A01N 25/04*** | (2006.01) |
| ***A01N 25/30*** | (2006.01) |
| ***A01P 13/00*** | (2006.01) |

(52) U.S. Cl.

CPC ............. *A01N 37/02* (2013.01); *A01N 25/04* (2013.01); *A01N 25/30* (2013.01); *A01P 13/00* (2021.08)

(58) Field of Classification Search

CPC ........ A01N 37/02; A01N 25/04; A01N 25/30; A01P 13/00

See application file for complete search history.

(56) References Cited

U.S. PATENT DOCUMENTS

| | | | | |
|---|---|---|---|---|
| 5,035,741 A * | 7/1991 | Puritch | A01N 65/00 504/142 |
| 5,106,410 A | 4/1992 | Puritch et al. | |
| 5,366,995 A | 11/1994 | Savage et al. | |
| 5,593,504 A * | 1/1997 | Cala | B08B 3/08 134/40 |
| 6,069,210 A * | 5/2000 | Cartridge | C09D 7/45 523/160 |
| 7,820,594 B2 * | 10/2010 | Coleman | A01N 37/02 424/407 |
| 2007/0249699 A1 * | 10/2007 | Coleman | A01N 2300/00 514/567 |
| 2016/0338348 A1 * | 11/2016 | Rader | A01N 25/02 |

FOREIGN PATENT DOCUMENTS

| | | |
|---|---|---|
| CN | 101743964 A | 6/2010 |
| WO | WO 95/17087 A1 | 6/1995 |

OTHER PUBLICATIONS

ICF. "Pelargonic Acid" 2006, p1-10. (Year: 2006).*
Tadros. "Surfactants in Agrochemicals" 1995. (Year: 1995).*
ACS "Sodium Laureth Sulfate" 2017 (Year: 2017).*
Tadros "Surfactants in Agrochemicals" 2015 (Year: 2015).*
BASF: "Safety Data Sheet Klearfac AA270 Surfactant", Dec. 22, 2016, Retrieved from Internet: URL:http://208.112.58.204/pridesol/documents/sds/Klearfac%20AA%20270%20Surfactant%20-%20BASF%20-%202016-12-22.pfd [retrieved on Sep. 25, 2020] XP055733918.

* cited by examiner

*Primary Examiner* — Sean M Basquill
*Assistant Examiner* — Rajan Pragani
(74) *Attorney, Agent, or Firm* — POLSINELLI PC

(57) ABSTRACT

The present invention relates to a concentrated emulsifiable composition comprising pelargonic acid and at least one emulsifying agent belonging to the class of anionic surfactants, preferably in acid form, at least one emulsifying agent belonging to the class of non-ionic surfactants and at least an organic solvent, a process for preparing said composition and use of said composition in herbicidal applications and as desiccant harvest aid. Said composition advantageously also finds use as a plant growth regulator.

22 Claims, No Drawings

PELARGONIC ACID-BASED HERBICIDE COMPOSITIONS

CROSS REFERENCE TO RELATED APPLICATIONS

This application is a National Phase filing under 35 U.S.C. § 371 of PCT/EP2021/054050 filed on Feb. 18, 2021; which application in turn claims priority to application Ser. No. 102020000003635 filed in Italy on Feb. 21, 2020. The entire contents of each application are hereby incorporated by reference.

The project that led to the invention was funded by the Bio Based Industries Joint Undertaking Public-Private Partnership under the European Union's Horizon 2020 research and innovation programme, under Grant Agreement No. 745012.

The present invention relates to a concentrated emulsifiable composition comprising pelargonic acid and at least one emulsifying agent belonging to the class of anionic surfactants, preferably in acid form, at least one emulsifying agent belonging to the class of non-ionic surfactants and at least an organic solvent, a process for preparing said composition and the use of said composition in herbicidal applications.

This composition is also advantageously used as a plant growth regulator.

Plant protection products are generally intended for one of the following uses: to protect plants or plant products from all harmful organisms or to prevent the effects of such organisms, to influence vital plant processes such as substances other than nutrients that affect plant growth, to conserve plant products, to destroy unwanted plants or plant parts, or to control or prevent unwanted plant growth. Plant protection products include herbicides, or weed killers, which are substances used to control weeds.

Herbicides can be selective or total (non-selective). The selectivity of the herbicidal function is essentially related to the nature of the active ingredient and also to its concentration, the way in which the herbicide is applied to the soil or plants, and even the mechanical vehicle used for its distribution.

Herbicides applied to foliage can act either locally, by damaging leaf tissue and buds, or by a general mechanism, after absorption and transport of the substance into the root parts of the plant (systemic herbicides or transport herbicides). Herbicides applied to the soil act either by directly damaging the root system or by preventing seed germination.

Another classification divides herbicides into pre-emergence herbicides, which target the weed at the seedling stage and suppress its development before it can compete with the crop, and post-emergence herbicides, which suppress the already developed weed. Pre-emergence herbicides tend to leave residues in the soil which can be environmentally disadvantageous.

Compositions based on fatty acids for use in herbicide applications are known from the literature; see, by way of example, patent applications WO 91/05471 and WO 91/05472 (Safer Inc.), EP 0 868 849 (W. Neudorff GmbH KG).

In particular, pelargonic acid or nonanoic acid is active against a broad spectrum of annual and perennial weeds, mono and dicotyledons, algae and mosses. Its herbicidal activity is typically in post-emergence weed control, i.e.

contact activity at foliar level. Pelargonic acid generally acts as a contact desiccant on the aerial parts of weeds to which the product is applied.

As indicated in the WAASA Herbicide Handbook (1 Jan. 1998, pp. 55-57), a commercially available nonanoic acid under the trade name Scythe® is a non-selective, broad-spectrum foliar herbicide that can be used to control plant growth during emergence.

Pelargonic acid does not have any residual action and this has some disadvantages such as an insufficiently long control period for the weeds, and their possible regrowth.

Furthermore, one of the problems associated with the use of pelargonic acid as a herbicide is related to the high dosages that are required to achieve the desired effect, which makes its use in open fields difficult and uneconomic.

The commercially available herbicide formulation under the brand name FINALSAN®, for example, contains 18.8% by weight of pelargonic acid, is diluted in water at a rate of 20 L of product per 100 L of water (according to label indications) and used in the field at a rate of 170 L of product per ha, requiring approximately 830 L/ha of water.

In order to reduce the volumes required, it is generally necessary to formulate more concentrated compositions of pelargonic acid which can be diluted in water prior to use and which retain their herbicidal activity. The resulting dilute compositions are typically prepared in emulsion form. Such aqueous emulsions are generally characterised by low stability and may consequently exhibit phase separation, thus being unsuitable for effective distribution on weeds.

Moreover, the stability of such emulsions is highly dependent on temperature and water hardness, making them usable only under certain conditions.

In order to increase the stability of emulsions, the above-mentioned concentrated compositions generally contain emulsifying agents.

The commercial formulation BELOUKHA®, for example, contains 72% by weight of pelargonic acid and co-formulants, is diluted in water at 8% v/v and used in the field at a dose of 16 L/ha. However, when emulsified in water at the application rate, this formulation shows extensive phase separation, which occurs immediately after preparation, and even sooner the higher the temperature and the hardness of the water used. The consequence of this is difficulty in distributing the product evenly in the field, even if it has been prepared immediately before use.

There therefore remains a need to find pelargonic acid formulations characterized by a high content of active alternative to those described above that can be diluted in water to obtain an emulsion ready for use stable enough to ensure full efficacy in herbicide applications.

The Applicant has now found that the above technical problem can be solved by a concentrated emulsifiable composition comprising, in addition to pelargonic acid, at least one emulsifying agent belonging to the class of anionic surfactants, at least one emulsifying agent belonging to the class of non-ionic surfactants and at least an organic solvent. In particular, the composition according to the invention can be advantageously diluted in water, to generate an aqueous emulsion having good emulsion stability also at high concentrations of active ingredient. Surprisingly, the composition according to the invention, applied in the form of an aqueous emulsion, exhibits increased efficacy as a total-action herbicide, which is significantly superior to commercial or literature-described formulations based on pelargonic acid, even at the same dose of active ingredient used. Advantageously, the composition according to the invention can also maintain its efficacy for more than 2-4 weeks, depending on the meteorological conditions, allowing an efficacious control of weeds for a period sufficiently long to prevent the regrowth of most weeds.

These characteristics also allow the quantities of active ingredient required to obtain adequate control of weed development to be significantly reduced, with a consequent reduction in the volumes of formulation to be used in the field.

U.S. Pat. No. 7,820,594 B2 discloses herbicidal compositions comprising pelargonic acid and anionic or non-ionic surfactants, which is shown to be effective in the control of weeds only for the first few days after treatment.

In a first aspect, the present invention relates to a composition comprising:

(a) 40-90% by weight of pelargonic acid; and (b) at least one emulsifying agent belonging to the class of anionic surfactants having formula (I) up to 15% by weight $$(R—(OCHR_1—CHR_2)_n—(OCHR_3—CHR_4)_m—O—)_q—Z$$

where R is a linear or branched $C_4$-$C_{18}$ alkyl radical, R1, R2, R3 and R4 are independently H or $CH_3$, n and m are identical or different integers from 0 to 30, and at least one of them is not 0, q is 1 or 2, Z represents a sulfate or phosphate group in acid form or a salt thereof, (c) 5-55% by weight of at least one organic solvent, (d) from 1 to <15% by weight of at least one emulsifying agent belonging to the class of non-ionic surfactants, wherein the ratio between the weight content of the sum of anionic surfactants (b) and non-ionic surfactants (d) respect to pelargonic acid is 0.05-0.15.

Surprisingly has been found that, with the same quantity of active ingredient distributed in the field, ratios between the weight content of the sum of anionic surfactants (b) and non-ionic surfactants (d) higher than 0.15 respect to pelargonic acid in fact cause a decrease in the herbicidal activity of the composition.

The composition of the invention comprises 40-90% by weight of pelargonic acid, preferably 40-85% by weight, more preferably 75-85% by weight, with respect to the total weight of the composition.

The composition of the invention comprises at least one emulsifying agent belonging to the class of anionic surfactants having formula (I) from >0 to 15% by weight. Preferably the emulsifying agent belonging to the class of anionic surfactants having formula (I) is ≥0.5, ≥1, ≥2, ≥3, ≥4, ≥5% by weight and ≤15, ≤14, ≤13, ≤12, ≤11, ≤10, ≤9% by weight, with respect to the total weight of the composition. Preferably the emulsifying agent belonging to the class of anionic surfactants having formula (I) is from 3 to 13% by weight, more preferably from 5 to 10% by weight, with respect to the total weight of the composition.

The composition of the invention comprises 5-55% by weight of at least one organic solvent, preferably 5-40% by weight, with respect to the total weight of the composition.

The composition of the invention comprises at least one emulsifying agent belonging to the class of non-ionic surfactants. The total amount of emulsifying agents belonging to the class of non-ionic surfactants is from 1 to <15% by weight, preferably 1-10 by weight, more preferably 1-5% by weight, with respect to the total weight of the composition.

The composition according to the invention is particularly advantageous when the content of the anionic surfactants (b) is above 5% by weight, preferably 10-60% by weight, with respect to the total weight of anionic and non-ionic surfactants.

The compositions according to the present invention can be easily formulated, resulting in homogeneous solutions conveniently having high stability, so that they can be advantageously stored and transported.

When diluted in water at the application dosage, the compositions according to the present invention form stable emulsions even at high concentrations of pelargonic acid, under different conditions of temperature and water hardness.

The compositions according to the present invention also have a less pronounced odour than commercial formulations.

These compositions are also surprisingly effective as herbicides, advantageously having total action.

The composition according to the present invention is typically in liquid form.

The pelargonic acid of the composition according to the present invention is generally produced from a vegetable oil having a high oleic or erucic acid content. The vegetable oil used in the production of pelargonic acid useful for use in the composition according to the present invention is typically selected from the group consisting of sunflower oil, safflower oil, oils from Brassicaceae such as *Crambe abyssinica, Brassica carinata, Brassica napus* (rapeseed), and oils from Cardueae such as *Cynara cardunculus* (thistle). The pelargonic acid of the composition according to the present invention is preferably produced from high oleic sunflower oil.

The pelargonic acid of the composition according to the present invention is advantageously produced by an oxidative cleavage process of a vegetable oil, preferably high oleic sunflower oil, typically in the presence of one or more oxidizing agents, as described, for example, in patent EP 2 519 489. The process of oxidative cleavage of a vegetable oil is advantageously conducted in the absence of ozone.

The process of oxidative cleavage of a vegetable oil generally differs from processes commonly known in the art for the production of saturated aliphatic monocarboxylic acids, in particular pelargonic acid, such as, for example, the process of ozonolysis of rapeseed oil or tallow oil or the process of hydroformylation of olefins, in particular 1-octene.

The composition according to the present invention may contain pelargonic acid in a mixture with other aliphatic monocarboxylic acids. In such a case, said aliphatic monocarboxylic acids are advantageously present in an amount between 0.5-15% by weight, preferably 0.5-10% by weight, more preferably 0.5-8% by weight relative to the weight of the pelargonic acid. Said aliphatic monocarboxylic acids other than pelargonic acid, if present, are preferably chosen from:

- saturated aliphatic monocarboxylic acids, preferably selected from the group consisting of caprylic acid, capric acid, undecanoic acid, 10-undecenoic acid, lauric acid, myristic acid, palmitic acid, oleic acid, ricinoleic acid and mixtures thereof.
- monounsaturated aliphatic monocarboxylic acids, preferably monounsaturated 9-carbon carboxylic acid having formula (II):

$$CH3\text{-}(CH2)_m—CH=CH—(CH2)_n—COOH$$

wherein the sum (m+n) equals 5, with m and n individually representing 0 or an integer selected from 1, 2, 3, 4 and 5, as described for example in patent application WO 2019/030060.

aliphatic keto acids having formula (III): R—C(O)—(CH2)$_n$—COOH wherein R represents H or an alkyl group, preferably a $C_1$-$C_5$ alkyl group, more preferably a $C_1$-$C_4$ alkyl group, and n represents 0, 1 or 2, as described for example in patent application WO 2019/030062.

The composition according to the present invention may comprise at least one further herbicidal agent. Any further herbicidal agents are preferably selected from the group consisting of glyphosate, sulfanilureas, carfentrazone ethyl, their derivatives and mixtures thereof.

Non-limiting particular examples of herbicides include, for example, the following active ingredients: Aclonifen, Amidosulfuron, Aminopyralid, Azimsulfuron, Benfluralin, Bensulfuron-methyl, Bifenox, Bispyrac-Na, Cialofop-butyl, Cicloxidim, Ciprosulfamide, Cletodim, Clodinafop-propargyl, Clomazone, Clopyralid, Cloquintocet-mexyl, Chlorotoluron, Chlorprofam, Chlorsulfuron, Dazomet, Desmedipham, Dicamba, Diclofop-methyl, Diflufenican, Dimethenamid-P, Etofumesate, Ethoxysulfuron, Fenchlorim, Fenoxaprop-P-ethyl, Flazasulfuron, Florasulam, Fluazifop-P-butyl, Flufenacet, Fluroxypyr, Foramsulfuron, Glyphosate, Glyphosate trimesium, Glyphosate ammonium, Haloxyfop-P, Imazamox, Imazosulfuron, Iodosulfuron-methyl-Na, Ioxinil, Isoproturon, Isoxaben, Isoxaflutole, Lenacil, Mesosulfuron-methyl, Mesotrione, Metamitron, Metam Na, Methazachlor, Metosulam, Metribuzin, Metsulfuron-methyl, Nicosulfuron, Orthosulfamuron, Oxadiargyl, Oxadiazon, Oxasulfuron, Oxifluorfen, Pendimethalin, Penoxsulam, Pethoxamid, Picolinafen, Pyridate, Propizamide, Prosulfuron, Pyraflufen-ethyl, Rimsulfuron, S-metolachlor, Sulcotrione, Sulfosulfuron, Tembotrione, Terbuthylazine, Tifensulfuron-methyl, Triallate, Tralcoxydim, Triasulfuron, Tribenuron-methyl, Triflusulfuron-methyl and Tritosulfuron.

The emulsifying agent (b) of the composition according to the present invention comprises at least one surfactant selected from the anionic surfactants of formula (I).

According to one advantageous aspect of the present invention, only one of R1, R2, R3 and R4 is $CH_3$.

According to another aspect R1, R2, R3 and R4 are H. In other words, if one of n or m is 0, the substituents of the remaining repetitive unit (R1 and R2 or R3 and R4) are H.

Preferably the emulsifying agent belonging to the class of anionic surfactants is selected from the group of anionic surfactants in acid form.

For the purposes of the present invention, the term "anionic surfactant in acid form" means a surfactant whose negative charge (anion) is neutralised by the H+ ion. Preferably Z represents a phosphate group.

The anionic surfactant is preferably selected from the group consisting of mono and/or di-esterified sulfuric acid and mono and/or di-esterified phosphoric acids, more preferably mono-esterified.

Said anionic surfactant is most preferably selected from the group consisting of, for example: mono- and di-[alkyl-polyethylene glycol] phosphate, mono- and di-[alkyl-polyethylene glycol]phosphate, mono- and di-[alkyl-polyethylene glycol] sulfate, mono- and di-[alkyl-polyethylene glycol] sulfate, mono- and di-[alkyl-polyethylene glycol-polypropylene glycol] phosphate, mono- and di-[alkyl-polyethylene glycol-polypropylene glycol] sulfate and mixtures thereof. Even more preferred are: mono-[alkyl-polyethylene glycol-polypropylene glycol] phosphate, mono-[alkyl-polyethylene glycol] phosphate, mono-[alkyl-polyethylene glycol] sulfate. For example, mono- and di-[cetyl-polyethylene glycol (10 EO)-polypropylene glycol (5 PO)]phosphate, mono- and di-[cetyl stearyl polyethylene glycol (11 EO)] phosphate, [dodecyl tetradecyl polyethylene glycol (2EO)] sodium phosphate. Even more preferred is mono- and di-[cetyl polyethyleneglycol (10 EO)-polypropyleneglycol (5 PO)] phosphate.

In this application "EO" means the group —(OCHR$_1$—CHR$_2$)— where $R_1$=$R_2$=H, while "PO" means the group —(OCHR$_3$—CHR$_4$)— where $R_3$ or $R_4$=$CH_3$.

The composition according to the present invention may comprise one or more surfactants selected from non-ionic surfactants (d).

For the purposes of the present invention, the term "non-ionic surfactant" means a surfactant without an electrical charge containing a hydrophilic part and a lipophilic part.

The non-ionic surfactant is preferably selected from the group consisting of alkoxylated alcohols, tri-styryl-phenols, alkoxylated fatty acid esters, such as polyethoxylated fatty acid esters, polypropoxylated fatty acid esters and ethoxy-propoxylated fatty acid esters and polyethoxylated vegetable oils.

Examples of alkoxylated alcohols include ethylene oxide-propylene oxide copolymers such as ethylene oxide-propylene oxide block copolymers or ethylene oxide-propylene oxide random copolymers.

Examples of alkoxylated fatty acid esters include, for example, at least partially alkoxylated derivatives of esters of sorbitan with at least one fatty acid selected from the group consisting of lauric acid, palmitic acid, stearic acid, oleic acid and ricinoleic acid, in particular polyethoxylated derivatives of esters of 3,6-sorbitan with C10-C18 fatty acids or ethoxy-propoxylated derivatives of esters of 3,6-sorbitan with C10-C18 fatty acids.

Non-limiting particular examples of polyalkoxylated derivatives of 3,6-sorbitan monoesters include, for example, those having a number of moles of oxyalkylene units in the range 10 to 50, more preferably 15 to 40.

Examples of polyalkoxylated vegetable oils include polyethoxylated derivatives of triglycerides of aliphatic carboxylic acids, in particular saturated and/or unsaturated $C_{14}$-$C_{20}$ aliphatic carboxylic acids.

Non-limiting particular examples of polyalkoxylated derivatives of aliphatic carboxylic acid triglycerides include, for example, polyethoxylated castor oil.

Preferably polyethoxylated castor oil has a number of moles of oxyethylene units (EO) in the range 20 to 50, more preferably 25 to 40.

According to one aspect of the invention, the composition does not contain cationic surfactants.

The compositions according to the invention comprise at least one organic solvent.

Organic solvents useful in the composition according to the invention are typically selected from the group consisting of water-insoluble organic solvents.

The water-insoluble organic solvents are typically selected from the group consisting of aliphatic hydrocarbons, esters of carboxylic acids such as, for example, diesters of dicarboxylic acids or ester amides of dicarboxylic acids, alcohols, unmodified vegetable oils (triglycerides) and transesterified vegetable oils with $C_1$-$C_4$ lower alcohols. Preferably, the water-insoluble organic solvents are selected from the group of unmodified vegetable oils (triglycerides) and transesterified vegetable oils with $C_1$-$C_4$ lower alcohols. More preferably, the water insoluble organic solvent is transesterified vegetable oil with methanol. More preferably, the water insoluble organic solvent are methyl esters of fatty acids (biodiesel). Even more preferably the water insoluble organic solvent is biodiesel having methyl-oleate as main component.

The composition according to the present invention advantageously consists of, with respect to the total weight of the composition:

(a) 40-90% by weight of pelargonic acid, (b) >0-15% by weight, preferably 3-13% by weight, more preferably 5-10% by weight of at least one emulsifying agent belonging to the class of anionic surfactants having formula (I)

$$(R{-}(OCHR_1{-}CHR_2)_n{-}(OCHR_3{-}CHR_4)_m{-}O{-})_q{-}Z$$

where R is a linear or branched $C_4$-$C_{18}$ alkyl radical,
R1, R2, R3 and R4 are independently H or $CH_3$,
n and m are identical or different integers from 0 to 30 and at least one of them is not 0, q is 1 or 2,
Z represents a sulfate or phosphate group in acid form or a salt thereof, preferably in acid form, (c) 5-55% by weight, more preferably 5-40% by weight of at least one organic solvent, (d) from 1 to <15% by weight, preferably 1-10%, more preferably 1-5% by weight of at least one emulsifying agent belonging to the class of non-ionic surfactants, wherein the ratio between the weight content of the sum of anionic surfactants (b) and non-ionic surfactants (d) respect to pelargonic acid is 0.05-0.15.

According to a preferred aspect of the present invention, the composition according to the invention preferably comprises or advantageously consists of, with respect to the total weight of the composition:

(a) 40-85% by weight of pelargonic acid, (b) 5-10% by weight of at least one emulsifying agent belonging to the class of anionic surfactants having formula (I)

$$(R{-}(OCHR_1{-}CHR_2)_n{-}(OCHR_3{-}CHR_4)_m{-}O{-})_q{-}Z$$

where R is a linear or branched $C_4$-$C_{18}$ alkyl radical,
R1, R2, R3 and R4 are independently H or $CH_3$,
n and m are identical or different integers from 0 to 30 and at least one of them is not 0, q is 1 or 2,
Z represents a sulfate or phosphate group in acid form or a salt thereof, preferably in acid form, (c) 5-55% by weight of at least one organic solvent, (d) 1-10% by weight of at least one emulsifying agent belonging to the class of non-ionic surfactants;

wherein the ratio between the weight content of the sum of anionic surfactants (b) and non-ionic surfactants (d) respect to pelargonic acid is 0.05-0.15.

According to a particularly preferred aspect of the present invention, the composition according to the invention preferably comprises or advantageously consists of, with respect to the total weight of the composition:

(a) 40-85% by weight of pelargonic acid, (b) 5-10% by weight of at least one emulsifying agent belonging to the class of anionic surfactants having formula (I)

$$(R{-}(OCHR_1{-}CHR_2)_n{-}(OCHR_3{-}CHR_4)_m{-}O{-})_q{-}Z$$

where R is a linear or branched $C_4$-$C_{18}$ alkyl radical,
R1, R2, R3 and R4 are independently H or $CH_3$,
n and m are identical or different integers from 0 to 30 and at least one of is not 0, q is 1 or 2,
Z represents a sulfate or phosphate group in acid form or a salt thereof, preferably in acid form, (c) 5-40% by weight of at least one organic solvent, (d) 1-5% by weight of at least one emulsifying agent belonging to the class of non-ionic surfactants;

wherein the ratio between the weight content of the sum of anionic surfactants (b) and non-ionic surfactants (d) respect to pelargonic acid is 0.05-0.15.

The composition according to the invention can further comprise 0-5% by weight, with respect of the total weight of the composition, of adjuvants.

Adjuvants which may be present in the composition according to the invention are preservatives, dyes and odor improvers, antifoaming agents, viscosity and rheology modifiers. Examples of preservatives are 2-hydroxybiphenyl, sorbic acid, p-hydroxybenzaldehyde, methyl p-hydroxybenzoate, benzaldehyde, benzoic acid, propyl p-hydroxybenzoate and p-nitrophenol. Sorbic acid is preferred. The content of preservative in the emulsion may be 0.01-1% by weight, with respect of the total weight of the composition.

Odor improvers which it is possible to employ are perfume oils.

The composition of the invention can advantageously comprise 0.1-5% by weight, with respect of the total weight of the composition, of viscosity and rheology modifiers. Examples of viscosity and rheology modifiers are polyaklyl methacrylate in mineral or vegetable oil, synthetic esters with alkyl of different length (from C1 to C18 and beyond, linear or branched), natural rubber (polyisoprene) dissolved in vegetable oils or esters or mineral oil, polyolefin in general such polyisobutene, ethylene-propylene copolymers or poly-α-olefins, polycondensed fatty acids, polymer esters such complex esters, chemically modified vegetable oils, such as for example, epoxydized oils, estolides, or polymerized vegetable oils, esters of rosin acid, and polyalkylene glycols, hydroxyalkyl alkyl cellulose ether, wherein the alkyl group contains from 1 to 3 carbons and the hydroxyalkyl group contains from 2 to 4 carbons, such as for example hydroxypropyl cellulose ethers or hydroxyethyl cellulose ethers. Hydroxyalkyl alkyl cellulose ether are preferred.

The composition of the invention can advantageously comprise 0.001-0.5% by weight, with respect of the total weight of the composition, of antifoaming agents. Examples of antifoaming agents are oxirane polymers, polysiloxanes, and acrylate polymers in polyalkylen glycol, in esters, vegetable oil or mineral oil.

In a second aspect, the present invention relates to a process for producing the composition according to the invention, said process comprising mixing:

(a) pelargonic acid and (b) at least one emulsifying agent belonging to the class of anionic surfactants having formula (I)

$$(R{-}(OCHR_1{-}CHR_2)_n{-}(OCHR_3{-}CHR_4)_m{-}O{-})_q{-}Z$$

where R is a linear or branched $C_4$-$C_{18}$ alkyl radical,
R1, R2, R3 and R4 are independently H or $CH_3$,
n and m are identical or different integers from 0 to 30 and at least one of them is not 0, q is 1 or 2,
Z represents a sulfate or phosphate group in acid form or a salt thereof, (c) at least one organic solvent, (d) at least one emulsifying agent belonging to the class of non-ionic surfactants.

Mixing is typically conducted under agitation, under process conditions designed to obtain a homogeneous composition.

In a third aspect, the present invention relates to an aqueous emulsion comprising:

the composition according to the invention, and an aqueous phase.

The aqueous emulsion according to the present invention is advantageously prepared by dilution of the composition according to the present invention in an aqueous phase.

The aqueous emulsion according to the present invention typically comprises:

0.1-15% by volume, relative to the total volume of the aqueous emulsion, of the composition according to the invention, 85-99.9% by volume, relative to the total volume of the aqueous emulsion, of an aqueous phase.

The aqueous emulsion according to the present invention preferably comprises:

0.5-12% by volume, relative to the total volume of the aqueous emulsion, of the composition according to the invention, 88-99.5% by volume, relative to the total volume of the aqueous emulsion, of an aqueous phase.

For the purposes of the present invention, the term "emulsion" means a dispersed system comprising two immiscible liquid phases stabilised by an emulsifying agent. The emulsion typically has two immiscible liquid phases, one of which is dispersed in the other, in the form of droplets generally having a median diameter of between 0.5 μm and 10 μm.

An emulsion is thus distinguished from a mixture in which two immiscible liquid phases are separated from each other.

The aqueous emulsion according to the invention is advantageously an oil-in-water emulsion.

The aqueous emulsion according to the invention is stable for at least 24 hours and even after 24 hours advantageously retains stability following stirring for at least 30 minutes, in comparison with the commercial product BELOUKHA®.

The aqueous emulsion according to the invention is stable over a wide temperature range, typically from 6° C. to 30° C., in comparison with the commercial product BELOUKHA®.

The aqueous emulsion according to the invention is stable under various water hardness conditions, typically from 20 to 342 ppm $CaCO_3$.

A person skilled in the art will easily be able to assess the stability of the emulsion using known techniques; for example, using the CIPAC MT36 standard.

The aqueous emulsion according to the invention exhibits excellent herbicidal activity on the basis of the EPPO (European Plant Protection Organization) PP1 plant protection standards (Efficacy evaluation of Plant Protection Products).

In particular, the aqueous emulsion according to the invention exhibits excellent total-action herbicidal activity and is particularly effective as a post-emergence herbicide. In a fourth aspect the present invention thus relates to the use of aqueous emulsion as an herbicide.

In particular, application of the aqueous emulsion directly to the plant causes the rapid drying of plant tissues, through an action of denaturing and destroying the cuticle and plant cell membranes. This action causes a rapid release of cellular juices with subsequent dehydration and death of the plant tissues affected by non-selective contact action.

According to one embodiment of the present invention, the aqueous emulsion can be used as a broad-spectrum herbicide with desiccant action and also as pre-harvest aids for crop desiccation (i.e. in potato and large-seed legumes). The composition according to the present invention can find application in the weed control in grapevines, orchards and other fruiting tree crops such as olives and nuts. In particular, the aforementioned aqueous emulsion has been used as broad-spectrum desiccant herbicide in vines and in orchards. In these crops, weeds compromise crop productivity through competition for plant resources including water, soil nutrients, and light. In addition, in some instances, weeds harbor and vector plant pests and pathogens. Conventional techniques for managing weeds in the aforementioned crops entail pre- and post-emergence herbicide applications and/or mechanical operations (otherwise known as "tillage") underneath the vineyards and orchard plants, while permanent vegetative groundcovers are maintained between rows. The short-term effectiveness of residual herbicides as glyphosate and frequent mechanical operations has enabled growers to successfully cultivate these crops and to maintain the productivity. However, concern regarding the long term consequences of conventional weed management has created recent interest in alternative practices and/or in the use of herbicide with no-residual effects that provide effective weed control, while minimizing the negative environmental impacts associated with conventional weed management.

The efficacy as weed desiccant of the composition according to the present invention was higher than the commercial reference product (BELOUKHA®), considering the same dosage of active ingredient. In this application, the aqueous emulsion according to the invention is typically applied to the plant by conventional boom sprayer specifically designed for under-row band herbicide application.

In potatoes (*Solanum tuberosum* L.) the composition according to the present invention can find application as pre-harvest crop desiccation of the aerial part of the plants and/or of the haulms without damaging the tubers out from environmental conditions. In traditional crop management, the agents used as pre-harvest aids are herbicides and/or defoliants that artificially accelerate the drying of plant tissues thus facilitating the mechanical harvesting of the crop.

The major potato desiccant (that comprises diquat as active ingredient) has been banned and withdrawn from the market by EU starting from the 4 May 2019, due to concerns related to the exposure of by-standers and residents and also its effect on bird life. Actually, the desiccation before potato harvesting is a common operation executed via mechanical destruction and/or chemical desiccation with the use of different active ingredient such as pyraflufen-ethyl and pelargonic acid, with variable results from the point of view of the efficacy. The composition according to the invention shows higher efficacy as potato pre-harvest desiccant compared to the commercial reference product (BELOUKHA®), considering the same dosage of active ingredient.

In a fifth aspect, the present invention relates to a method for controlling or suppressing the growth of a plant, said method comprising applying the aqueous emulsion according to the invention to the plant.

In fact, the composition according to the present invention also finds application as a plant growth regulator in controlling the growth of plants or parts thereof.

In particular, the aforementioned aqueous emulsion has been used in the control of suckers in grape vines (*Vitis vinifera* L.) and in the suppression of axillary shoots in tobacco plants (*Nicotiana tabacum* L.). In addition, as plant growth regulator, the aforementioned aqueous emulsion has been evaluated also as blossom thinner in apple (*Malus domestica* Borkh).

In vines, the elimination of shoots originating in the basal portion of the stem (suckers) is an essential operation, since suckers would take away nourishment and energy from the productive part of the plant and reduce the aeration of the bunches, causing plant health problems. In the traditional technique, suckers are removed manually, mechanically or using residual chemical products with a high environmental impact (glufosinate ammonium). Use of the compositions according to the present invention in this sucker-removal application was superior to the efficacy of the commercial reference product (BELOUKHA®), for the same dosage of active ingredient.

In tobacco, a crop in which leaves are the main product, the development of secondary shoots leads to withdrawal of the nutrients necessary for leaf growth and a loss of product quality. The removal of axillary shoots is therefore an extremely important operation. In the traditional technique, this operation is performed manually (suckering), with high labour costs, or using chemical products (n-decanol, maleic hydrazide), which present critical operational and sustainability issues for the supply chain (long return time and preharvest interval, impact due to the strong persistent odour of n-decanol-based formulations).

Return time means the time that must elapse between treatment and the operator's return without wearing the appropriate protection, while pre-harvest interval means the minimum number of days that must elapse between the date of treatment with the plant growth regulator and the date of harvest of the treated product. The activity of controlling axillary buds in tobacco using the compositions according to the invention was clearly superior to that obtained with the commercial reference formulation BELOUKHA®, for the same dosage of active ingredient, with important implications from the point of view of modernization of the tobacco supply chain, as well as drastically reducing to substantially eliminating the adverse impact linked to the persistent odor of n-decanol-based formulations.

The aqueous emulsion according to the invention is typically applied to the plant by spraying. In applications as a plant growth regulator the spray should target the main axis of the plant using sprayer-bar.

In apple, the blossom/fruit thinning is the removal of a part of the flower and/or fruit crop before it matures on the tree and it is a necessary standard management procedure. In fact, the excess of fruit blossoms and fruit in apple trees often results in low quality marketable production. An additional problem is that the biennial fruits as apple have excessively large crops followed by insufficient crops in alternate years. This pattern can be disrupted, and constant desirably-sized crops can be obtained on a regular basis by proper thinning techniques. There are three commonly-used methods for blossom/fruit thinning: mechanical, chemical, and by hand.

In the handly operation, workers remove sufficient fruit to provide satisfactory fruit thinning. Hand thinning is very labour intensive and expensive technique. In recent years machines for mechanical thinning of apple flowers have been developed. These machines use a series of knotted ropes, which are dragged through the trees to knock off a proportion of the flowers. This practice causes in many cases considerable damage to the trees and thinning efficacy was not adequate on some tree architecture that must be adapted for the application of this technique. In addition, some increases in pests (such as aphids) and diseases were noted on the machine-thinned trees. Chemical thinning would be preferred from a cost standpoint, but environmental concerns, as well as in consistent results, are major drawbacks to existing chemical methods. The inconsistent results include overthinning, underthinning, and foliage injury.

The success of chemical fruit thinning strategies can depend upon a number of factors including variety, tree condition, fruit set, proximity to pollinizers, weather, the active ingredient used, and the specific application protocol.

The activity of blossom thinning in apple using the compositions according to the invention was comparable to that obtained with the commercial reference formulation Ethrel C® (with Ethephon as active ingredient), with important implications from the point of view of efficacy, taking into account that Ethephon produces a very variable thinning response, ranging from almost no thinning to total inhibition of fruit set.

The following examples illustrate the present invention for non-limiting purposes.

EXAMPLES

Materials

- Pelargonic acid (98% purity by weight), obtained by the oxidative cleavage of high oleic sunflower oil.
- Commercially available herbicide formulation under the trade name BELOUKHA® containing pelargonic acid (72% by weight corresponding to approximately 680 g/l of active ingredient and without anionic and cationic surfactant) (Label authorised by Executive Decree of 26 Feb. 2016).
- Emulsifier A (anionic surfactant): [cetyl-polyethylene glycol (10 EO)-polypropylene glycol (5 PO)] phosphate acid,
- Emulsifier B (anionic surfactant): [cetyl stearyl polyethylene glycol (11 EO)] phosphate acid,
- Emulsifier C (anionic surfactant): [dodecyl tetradecyl polyethylene glycol (2EO)] sodium sulfate,
- Emulsifier D (non-ionic surfactant): Sorbitan Mono Oleate polyethoxylate (20 EO),
- Emulsifiers E (non-ionic surfactant): Sorbitan Mono Oleate,
- Emulsifier F (non-ionic surfactant): PEG-80 sorbitan laurate,
- Organic solvent A: methyl esters of fatty acids mainly comprising Methyl Oleate.

Example 1

A composition was prepared by mixing, with respect to the total weight of the composition:

80,7% by weight of pelargonic acid
6% by weight of Emulsifier A
3% by weight of Emulsifier D
1% by weight of Emulsifier E
9,3% by weight of Solvent A.

Example 2

A composition was prepared by mixing, with respect to the total weight of the composition:

80,7% by weight of pelargonic acid
6% by weight of Emulsifier B
3% by weight of Emulsifier D
1% by weight of Emulsifier E
9,3% by weight of Solvent A.

Example 3

A composition was prepared by mixing, with respect to the total weight of the composition:

80,7% by weight of pelargonic acid
6% by weight of Emulsifier C
3% by weight of Emulsifier D
1% by weight of Emulsifier E
9,3% by weight of Solvent A.

Comparative Example 4

Commercially available herbicide formulation under the trade name BELOUKHA® containing pelargonic acid (72% by weight corresponding to approximately 680 g/l active ingredient).

Comparative Example 5

A composition was prepared by mixing, with respect to the total weight of the composition:

80% by weight of pelargonic acid
5% by weight of Emulsifier D
5% by weight of Emulsifier F
10% by weight of Solvent A.

Example 6

A composition was prepared by mixing, with respect to the total weight of the composition:

80% by weight of pelargonic acid
1% by weight of Emulsifier A
4% by weight of Emulsifier D
5% by weight of Emulsifier F
10% by weight of Solvent A.

Comparative Example 7

A composition was prepared by mixing, with respect to the total weight of the composition:

41% by weight of pelargonic acid
1% by weight of Emulsifier A
9% by weight of Emulsifier D
49% by weight of Solvent A.

In the composition of Comparative Example 7, the ratio between the weight content of the sum of anionic surfactants (b) and non-ionic surfactants (d) respect to pelargonic acid is 0.25, so higher than 0.15.

The compositions of Examples 1-3 have a density of 0.91 g/cm$^3$ at ambient temperature, Example 6 and Comparative Example 5 have a density of 0.92 g/cm$^3$ at ambient temperature. Examples 1-3, 6 and Comparative Example 5 have an active ingredient concentration (i.e. 100% pelargonic acid) of approximately 720 g/1.

The compositions of Comparative Example 7 have a density of 0.90 g/cm$^3$ at ambient temperature and an active ingredient concentration (i.e. 100% pelargonic acid) of approximately 360 g/1.

The compositions of Examples 1-3, 6 and Comparative Examples 4, 5 and 7 were diluted in water at different concentrations and tested for:

- emulsion stability (Example 8, Tables 2-4), evaluated for emulsions prepared by diluting the compositions of Examples 1-3 and Comparative Example 4 at 8 and 10% v/v;
- herbicidal activity (Example 9, Tables 5-6) by distributing the prepared diluted emulsions in the field:
  - the composition of Example 1 at 6.0 and 7.55% v/v (doses of 8640 g/ha and 10880 g/ha of active ingredient),
  - the composition of Examples 2, 3, 6 and of Comparative Example 5 at 7.55% v/v (doses of 10880 g/ha of active ingredient),
  - the composition in Comparative Example 4 at 8% v/v (dose equal to 10880 g/ha of active ingredient),
  - the composition in Comparative Example 7 at 15.10% v/v (dose equal to 10880 g/ha of active ingredient);
- effectiveness in controlling tobacco buds (Example 10, Table 7) by applying the prepared emulsions by diluting:
  - the composition in Example 1 at 0.6 and 1% v/v (doses of 2592 g/ha and 4320 g/ha active ingredient),
  - the composition of Comparative Example 4 at 1.2% v/v (dose equal to 4896 g/ha of active ingredient);
- effectiveness in the control of suckers in grape vines (Example 11, Table 8) by applying the prepared emulsions by diluting:
  - the composition in Example 1 at 7.55% v/v (doses of 10880 g/ha active ingredient),
  - the composition of Comparative Example 4 at 8% v/v (dose equal to 10880 g/ha of active ingredient);
- effectiveness in the weed control in apple orchard (Example 12, Table 9) by applying the prepared emulsions by diluting:
  - the composition in Example 1 at 6.00 and 7.55% v/v (doses of 8640 and of 10880 g/ha active ingredient),
  - the composition of Comparative Example 4 at 8% v/v (dose equal to 10880 g/ha of active ingredient);
- effectiveness as pre-harvest desiccant in potato (Example 13, Table 10) by applying the prepared emulsions by diluting:
  - the composition in Example 1 at 6.00 and 7.55% v/v (doses of 8640 and 10880 g/ha active ingredient),
  - the composition of Comparative Example 4 at 8% v/v (dose equal to 10880 g/ha of active ingredient).

Example 8. Emulsion Stability Comparison

The stability of the aqueous emulsions prepared from the compositions in Examples 1-3 and Comparative Example 4 was tested at different temperatures and using water of different hardness, according to standard CIPAC method MT 36 (paragraph 36.1.1—hand shaking), under the conditions indicated below. The stability of 8 and 10% v/v emulsions was tested at 6, 20 and 30° C. in standard waters A and D (characteristics given in Table 1) and was assessed after 2 h, 24 h and, finally, after redispersion, at 24 h+30 min, verifying in all the tested conditions, a better behaviour in comparison with the commercial product.

TABLE 1

Table 1. Characteristics of the standard waters used.

| Water | Ca:Mg ratio | Hardness (ppm $CaCO_3$) | French degrees ° F. | pH |
|---|---|---|---|---|
| Standard A | 1:1 | 20 | 2 | 5-6 |
| Standard D | 4:1 | 342 | 34.2 | 6-7 |

TABLE 2

Table 2. ml of oil separated at 2 h, 24 h and 24 h + 30 min from 8% v/v emulsions in standard water D, at 20° C.

| Emulsions at 8% v/v in standard water D | 20° C. 2 hours | 24 hours | 24 hours + 30 min |
|---|---|---|---|
| Example 1 | 0 | <0.5 | 0 |
| Example 2 | 0 | 1 | 0 |
| Example 3 | 0 | 1 | 0 |
| Comparative example 4 | 1 | 4 | 0.5 |

TABLE 3

Table 3. ml of oil separated at 2 h, 24 h and 24 h + 30 min from 10% v/v emulsions in standard water A, at 6° and at 30° C.

| Emulsions at 10% v/v | 6° C. | | | 30° C. | | |
|---|---|---|---|---|---|---|
| in standard water A | 2 hours | 24 hours | 24 hours + 30 min | 2 hours | 24 hours | 24 hours + 30 min |
| Example 1 | 0 | 0 | 0 | 0 | <2 | 0 |
| Comparative example 4 | 0.5 | 4 | 0.5 | 1 | 4 | 1 |

TABLE 4

Table 4. ml of oil separated at 2 h, 24 h and 24 h + 30 min from 10% v/v emulsions in standard water D, at 6° and at 30° C.

| Emulsions at 10% v/v | 6° C. | | | 30° C. | | |
|---|---|---|---|---|---|---|
| in standard water D | 2 hours | 24 hours | 24 hours + 30 min | 2 hours | 24 hours | 24 hours + 30 min |
| Example 1 | 0 | 0.5 | 0 | 0 | <2 | 0 |
| Comparative example 4 | 1 | 3 | 0.5 | 1 | 4 | 1 |

As shown by the results in Table 2-4, the aqueous emulsions according to the present invention are more stable than those prepared from equal dilutions of the herbicidal composition in Comparative Example 4 and no free oil separation was observed in the final assessment, after redispersion at 24 h+30 min.

Example 9. Field Test of Herbicidal Activity Against Natural Infestation

The herbicidal activity of the aqueous emulsions prepared from Examples 1-3 and 6 was evaluated in a field whose floral composition consisted mainly of dicotyledonous weeds (in particular *Artemisia vulgaris* L., *Capsella bursa-pastoris, Taraxacum officinale* and *Medicago sativa* L.) and monocotyledonous weeds (*Cynodon dactylon* and *Poa pratensis*), compared with the emulsion prepared from Comparative Examples 4, 5 and 7.

In order to test this activity on natural infestation, 7.55% v/v dilutions of the compositions in Examples 1-3, 6 and Comparative Example 5, 8% v/v of the composition in Comparative Example 4 and 15.10% v/v of the composition in Comparative Example 7 were prepared, so that an equal dose of active ingredient (10880 g/ha) was distributed over the field using the same volume of aqueous emulsion. In particular, 14.5 L/ha of the aqueous emulsion prepared from the compositions of Examples 1-3, 6 and of Comparative Example 5, 16 L/ha of the aqueous emulsion prepared from the composition of Comparative Example 4 and 29.0 L/ha of the aqueous emulsion prepared from the composition in Comparative Example 7 were distributed. Evaluations of herbicidal activity were carried out at four relevant times, 1, 3, 7 and 12 DAA (day after application) respectively and were conducted according to the standards defined by EPPO (Efficacy evaluation of plant protection products standards PP1/152(4); PP1/181(4)). A visual efficacy evaluation score (% desiccation) was assigned on a scale of 0-100% compared to the untreated control (equal to 0%). The data relating to evaluation of the effectiveness of the treatments was analyzed statistically using ANOVA tests and the means were compared using Tukey tests, for significance levels $p \le 0.05$. The results are shown in Table 5.

TABLE 5

Table 5. Herbicidal activity against natural infestation (% 0-100 visual rating); Tukey test$_{a,\ b}$ $p \le 0.05$, $n = 3$

| Emulsions | Active ingredient dose (g/ha) | Measurement I 1 DAA | Measurement II 3 DAA | Measurement III 7 DAA | Measurement IV 12 DAA |
|---|---|---|---|---|---|
| Example 1 | 10880 | 86.7 ± 2.9a | 83.3 ± 2.9a | 76.7 ± 2.9a | 75.0 ± 0.0a |
| Example 2 | 10880 | 83.3 ± 2.9a | 80.0 ± 0.0ab | 75.0 ± 0.0a | 71.7 ± 2.9ab |
| Example 3 | 10880 | 81.7 ± 2.9a | 76.7 ± 2.9b | 75.0 ± 0.0a | 70.0 ± 0.0b |
| Comparative Example 4 | 10880 | 70.0 ± 0.0b | 70.0 ± 0.0c | 66.7 ± 2.9b | 60.00 ± 0.0c |
| Comparative Example 5 | 10880 | 79.2 ± 4.5a | 70.0 ± 0.0c | 65.00 ± 0.0b | 60.00 ± 0.0c |
| Example 6 | 10880 | 86.0 ± 4.9a | 85.0 ± 0.0a | 75.0 ± 0.0a | 67.0 ± 4.0b |
| Comparative Example 7 | 10880 | 55.8 ± 8.4c | 43.3 ± 7.45d | 35.0 ± 5.0c | 25.0 ± 4.9d |

The results obtained in the field tests show statistically greater herbicidal activity against mono- and dicotyledonous weeds for the aqueous emulsions prepared from Examples 1-3 and 6 than for that prepared from Comparative Example 4 (that doesn't contain anionic and cationic emulsifiers), from Comparative Example 5 (that does not contain anionic emulsifiers) and from Comparative Example 7 (wherein the ratio between the weight content of the sum of anionic surfactants (b) and non-ionic surfactants (d) respect to pelargonic acid is above 0.15). In particular, for the same dose of active ingredient used (10880 g/ha) (Table 5), the herbicidal activity of the compositions according to the invention at 3 days after application was more than 10% higher than that for the Comparative Example 4 and 5, and more than 17% higher after 12 days. In addition, the herbicidal activity of the compositions according to the invention at 3 days after application was more than 40% higher than that for the Comparative Example 7, and more than 50% higher after 12 days.

The same evaluation was made by repeating the test under field conditions on natural infestation and comparing the herbicidal activity of two aqueous emulsions diluted at 6% and 7.55% v/v prepared from the composition in Example 1, with an 8% v/v dilution prepared from the composition in Comparative Example 4.

In particular, herbicidal activity was assessed by distributing a dose of 8640 g/ha and 10880 g/ha (using the 6 and 7.55% v/v emulsions according to the invention, respectively) and 10880 g/ha of active ingredient (using the 8% v/v emulsion prepared from the formulation in Comparative Example 4) over the field. The results are shown in Table 6.

TABLE 6

Table 6. Herbicidal activity against natural infestation (% 0-100 visual rating); Tukey test$_{a,\ b}$ $p \leq 0.05$, n = 3

| Emulsions (% v/v) | Active ingredient dose (g/ha) | Measurement I 1 DAA | Measurement II 3 DAA | Measurement III 7 DAA | Measurement IV 12 DAA |
|---|---|---|---|---|---|
| Example 1 (6%) | 8640 | 80 ± 4.1ns | 75 ± 4.1b | 75 ± 4.1ab | 70 ± 0.0b |
| Example 1 (7.55%) | 10880 | 90 ± 8.2ns | 85 ± 0.0a | 81.67 ± 2.4a | 80 ± 0.0a |
| Comparative example 4 (8%) | 10880 | 80 ± 4.1ns | 75 ± 4.1b | 68.33 ± 2.4b | 60 ± 0.0c |

The results obtained in the field tests shown in Table 6 show that after the first 12 days following application the herbicidal activity of the emulsion prepared from Example 1 was statistically higher than that in Comparative Example 4, even when using 20% less active ingredient.

Example 10. Evidence of Effectiveness in Tobacco Bud Control

The efficacy of the aqueous emulsion prepared from Example 1 in controlling tobacco buds was evaluated on plants of the Virginia Bright variety and compared with the emulsion prepared from Comparative Example 4.

To test such efficacy on tobacco buds, two dilutions of the composition of Example 1 were prepared, at 0.6% and 1% v/v, and one dilution at 1.2% v/v of the composition of Comparative Example 4. In particular, efficacy was assessed by applying 2592 and 4320 g/ha (using the 0.6% and 1% v/v emulsions according to the invention, respectively) and 4896 g/ha of active ingredient (using the 1.2% v/v emulsion prepared from the formulation of Comparative Example 4), respectively.

The trials were conducted according to EPPO PP standards 1/152(4), 1/135(4), 1/181(4) and 1/155(3). Three applications of each emulsion were carried out, one during pre-flowering (A) and two during post-flowering (B, C).

In order to evaluate the effectiveness of axillary bud control in tobacco according to EPPO PP 1/155(3), the number of active buds on a total of 5 apical buds was counted at four relevant times. The results are shown in Table 7.

TABLE 7

Table 7. Percentage of active buds out of the total five apical buds detected 7 days after the first application (7 DAA), 4 days after the second application (4 DAB), 7 and 13 days after the third application (7 DAC and 13 DAC) respectively ($p \leq 0.05$, Student-Newman-Keuls).

| Emulsions (% v/v) | Active ingredient dose (g/ha) | Measurement I 7 DAA | Measurement II 4 DAB | Measurement III 7 DAC | Measurement IV 13 DAC |
|---|---|---|---|---|---|
| Example 1 (0.6%) | 2592 | 100 a | 84 a | 82 a | 84 a |
| Example 1 (1%) | 4320 | 43 b | 41 b | 28 b | 28 b |
| Comparative Ex. 4 (1.2%) | 4896 | 100 a | 84 a | 82 a | 84 a |

While the emulsion prepared from Comparative Example 4 showed only a modest activity as a plant growth regulator, since after the third application 82-84% of active shoots were still recorded on the total of the five apical buds (see 7 DAC and 13 DAC), data recorded at the four relevant times showed surprising effectiveness of the 1% v/v emulsion according to the invention. The result is even more surprising if one considers that the concentration of active ingredient was lower than the comparison (1.2% v/v).

In particular, after the third application, the 1% v/v emulsion according to the invention showed surprisingly high tobacco bud control, with only 28% of the total of five apical buds being active.

The 0.6% v/v emulsion according to the invention gave comparable results to the comparison, although containing only about half the active ingredient.

Example 11. Evidence of Effectiveness in the Control of Suckers in Grape Vines The efficacy of the aqueous emulsion prepared from Example 1 in the control of suckers in grapes vines (*Vitis vinifera* L.) was compared with the emulsion prepared from Comparative Example 4.

To test such efficacy, dilutions were prepared, at 7.55% v/v of the composition from Example 1 and at 8.0% v/v of the composition from Comparative Example 4. In particular, efficacy was assessed by applying 10880 g/ha of active ingredient from both the dilutions (of the compositions from Example 1 and from Comparative Example 4).

The trial was performed according to Good Experimental Practice (GEP). All assessments and applications were done in accordance with the Guidelines: EPPO Standards PP 1/152(4), 1/135(4), 1/181(4), 1/161 (3) and 1/64 (4).

In order to evaluate the effectiveness of suckers control in grape vines according to EPPO PP 1/161 (3) (Control of suckers in grapevine), two different applications (the first application at the BBCH 55 phenological growth stage of the crop and the second one at the BBCH 67 stage) of each emulsion were carried out in the trial.

Before the first application, a uniform presence and development of active suckers was observed across the trial area. During the whole trial period, it was evaluated the suckers control recording the percentage of damaged and dead shoots. Evaluations of suckers control activity were carried out at different relevant times, at 22 and 43 DAB, respectively.

A visual efficacy evaluation score (% desiccation) was assigned on a scale of 0-100% compared to the untreated control (equal to 0%).

Data from the assessments were analysed by variance analysis (ANOVA). If significant effect of the treatment was obtained (on the basis of the ANOVA analysis) differences between means were checked with Student-Newman-Keuls (SNK) test (P=0.05).

The results of the trial are shown in Table 8.

TABLE 8

Table 8. Percentage of suckers control detected at 22 days after the second application (22 DAB) and at 43 days after the second application (43 DAB) respectively ($p \leq 0.05$, Student-Newman-Keuls).

| Emulsions (% v/v) | Active ingredient dose (g/ha) | Measurement I (22-DAB) | Measurement II (43-DAB) |
|---|---|---|---|
| Example 1 (7.55%) | 10880 | 62.6 a | 44.8 a |
| Comparative Ex. 4 (8%) | 10880 | 43.8 b | 36.2 b |

Data of Table 8 show that the aqueous emulsion prepared from Example 1 is more effective than the aqueous emulsion prepared from Comparative Example 4 (62.6% VS 43.8% at 22 DAB and 44.8% VS 36.2% at 43 DAB).

Example 12: Evidence of Effectiveness in the Weed Control in Apple Orchard

The efficacy of the aqueous emulsion prepared from Example 1 in the weed control in apple orchard cv. Brookfield (*Malus domestica* Borkh) was compared with the emulsion prepared from Comparative Example 4. In order to test such efficacy, two dilutions of the composition of Example 1 were prepared, at 6.00% and 7.55% v/v, and one dilution at 8.00% v/v of the composition of Comparative Example 4. In particular, the efficacy was assessed by applying 8640 and 10880 g/ha (using the 6.00 and 7.55% v/v emulsions according to the present invention, respectively) and 10880 g/ha of active ingredient (using the 8.00% v/v emulsion prepared from the formulation of Comparative Example 4), respectively.

The trial was performed according to Good Experimental Practice (GEP). All assessments and applications were done in accordance with the Guidelines EPPO Standards PP 1/152 (4) (Design and analysis of efficacy evaluation trials), 1/135 (4) (Phytotoxicity assessment), 1/181 (4) (Conduct and reporting of efficacy evaluation trials) and 1/90 (3) (Weeds in orchards and other fruiting tree crops such as citrus and olives).

The trial was set up in order to evaluate the efficacy and selectivity of each emulsion against weeds in apple orchard. The applications were performed twice at crop phenological growth stages BBCH 78 and BBCH 81. At the first timing of application, weed population was determined on the field and the numbers of target weeds per square meter was recorded. Weeds population was homogenous on the field. Evaluations of herbicidal activity were carried out at four relevant times, at 7 and 14 DAA and at 14 and 20 DAB, respectively.

A visual efficacy evaluation score (% desiccation) was assigned on a scale of 0-100% compared to the untreated control (equal to 0%).

The results of the trial are shown in Table 9.

TABLE 9

Table 9. Percentage of herbicidal activity detected at 14 days after the first application (14 DAA) and at 14 days after the second application (14 DAB) respectively ($p < 0.05$, Student-Newman-Keuls).

| Emulsions (% v/v) | Active ingredient dose (g/ha) | Measurement (14-DAA) *Poa annua* | Measurement (14-DAA) *Epilobium parviflorum* | Measurement (14-DAA) *Potentilla reptans* | Measurement (14-DAB) *Poa annua* | Measurement (14-DAB) *Epilobium parviflorum* | Measurement (14-DAB) *Potentilla reptans* |
|---|---|---|---|---|---|---|---|
| Example 1 (7.55%) | 10880 | 68.3 a | 73.5 a | 70.8 a | 66.3 a | 70.8 a | 68.8 a |
| Example 1(6%) | 8640 | 66.8 a | 71.5 a | 68.8 a | 63.0 a | 68.5 a | 65.8 ab |
| Comparative Ex. 4 (8%) | 10880 | 26.3 b | 45.0 b | 55.0 b | 38.8 b | 55.5b | 61.3 c |

These results clearly show that emulsions according to the invention (Example 1) are more effective than emulsion from Comparative Example 4 and guarantee a good control also on long term period (at 14 and 20 DAB), even if the concentration of active ingredient is lower than the comparison (8640 g/ha of Example 1 VS 10880 g/ha of Comparative Example 4).

Example 13: Evidence of Effectiveness as Pre-Harvest Desiccant in Potato

The efficacy as pre-harvest desiccant of the aqueous emulsion prepared from Example 1 was evaluated in potato cv. Mikado, compared with the emulsion prepared from Comparative Example 4.

In order to test this activity, 6.0 and 7.55% v/v dilutions of the composition from Example 1 and 8% v/v of the composition from Comparative Example 4 were prepared, so that an equal dose of active ingredient of 10880 g/ha for the 7.55% v/v dilution of the composition from Example 1 and 8% v/v of the composition from Comparative Example 4 was distributed over the field using the same volume of aqueous emulsion. In particular, 12.0 and 14.5 l/ha of the emulsions prepared from the composition of Example 1 and 16 l/ha of the emulsion prepared from the composition of Comparative Example 4 were distributed.

Evaluations of desiccant activity was carried out at 14 DAA (day after application) and was conducted according to the standards defined by EPPO Guidelines PP n. 135 (4) (Phytotoxicity assessment), PP n. 143 (3) (Desiccants used for potato), PP n. 152 (4) (Design and analysis of efficacy evaluation trials) e PP n. 181 (4) (Conduct and reporting of efficacy evaluation trials). A visual efficacy evaluation score (% desiccation) was assigned on a scale of 0-100% compared to the untreated control (equal to 0%). The data relating to evaluation of the effectiveness of the treatments was analyzed statistically using ANOVA tests and the means were compared using Tukey tests, for significance levels $p \leq 0.05$. The results of the trial are shown in Table 10.

TABLE 10

Table 10. Desiccant activity in potato crop (% 0-100 visual rating); Tukey test$_{a,\ b}$ $p \leq 0.05$, $n = 3$

| Emulsions | Active ingredient dose (g/ha) | Measurement I 14 DAA |
|---|---|---|
| Example 1 (6%) | 8640 | 63.6 a |
| Example 1 (7.55%) | 10880 | 67.0 a |
| Comparative Example 4 (8%) | 10880 | 27.8 b |

The results obtained in the field test show statistically greater desiccant activity for the aqueous emulsions prepared from Example 1 than for that prepared from Comparative Example 4 also at the lower dose of active ingredient of 8640 g/ha for the 6.00% v/v dilution of the composition from Example 1.

The invention claimed is:

1. A composition comprising, with respect to the total weight of the composition:

(a) 40-90% by weight of pelargonic acid; and (b) 0.5-15% by weight of at least one emulsifying agent belonging to the class of anionic surfactants having formula (I)

$$(R—(OCHR_1—CHR_2)_n—(OCHR_3—CHR_4)_m—O—)_q—Z$$

where R is a linear or branched $C_4$-$C_{18}$ alkyl radical, $R_1$, $R_2$, $R_3$ and $R_4$ are independently H or $CH_3$, n and m are identical or different integers from 0 to 30 and at least one of them is not 0, q is 1 or 2, Z represents a sulfate or phosphate group in acid form or a salt thereof, (c) 5-55% by weight of at least one organic solvent, (d) from 1 to <15% by weight of at least one emulsifying agent belonging to the class of non-ionic surfactants;

wherein the ratio between the weight content of the sum of anionic surfactants (b) and non-ionic surfactants (d) respect to pelargonic acid is 0.05-0.15.

2. The composition according to claim 1 comprising, with respect to the total weight of the composition:

(a) 40-85% by weight of pelargonic acid, (b) 5-10% by weight of at least one emulsifying agent belonging to the class of anionic surfactants having formula (I)

$$(R—(OCHR_1—CHR_2)_n—(OCHR_3—CHR_4)_m—O—)_q—Z$$

where R is a linear or branched $C_4$-$C_{18}$ alkyl radical, $R_1$, $R_2$, $R_3$ and $R_4$ are independently H or $CH_3$, n and m are identical or different integers from 0 to 30 and at least one of them is not 0, q is 1 or 2, Z represents a sulfate or phosphate group in acid form or a salt thereof, (c) 5-55% by weight of at least one organic solvent, (d) 1-10% by weight of at least one emulsifying agent belonging to the class of non-ionic surfactants;

wherein the ratio between the weight content of the sum of anionic surfactants (b) and non-ionic surfactants (d) respect to pelargonic acid is 0.05-0.15.

3. The composition according to claim 1, in which the content of the anionic surfactants (b) is above 5% by weight, with respect to the total weight of anionic and non-ionic surfactants.

4. The composition according to claim 1, wherein the emulsifying agent (b) belongs to the class of anionic surfactants in acid form.

5. The composition according to claim 1, wherein the anionic surfactant is selected from the group consisting of mono- and di-esterified phosphoric acids, and mixtures thereof.

6. The composition according to claim 1, wherein $R_1$, $R_2$, $R_3$ and $R_4$ are H.

7. The composition according to claim 1, wherein only one of $R_1$, $R_2$, $R_3$ and $R_4$ is $CH_3$.

8. The composition according to claim 1, wherein the emulsifying agent (b) is selected from: mono-[alkyl-polyethylene glycol-propylene glycol] phosphate, mono-[alkyl-polyethylene glycol] phosphate, mono-[alkyl-polyethylene glycol] sulfate, and mixtures thereof.

9. The composition according to claim 1, wherein the organic solvent is selected from the group consisting of aliphatic hydrocarbons, esters of carboxylic acids, alcohols, unmodified vegetable oils (triglycerides), transesterified vegetable oils with $C_1$-$C_4$ lower alcohols, and mixtures thereof.

10. The composition according to claim 2, in which the content of the anionic surfactants (b) is above 5% by weight, with respect to the total weight of anionic and non-ionic surfactants.

11. The composition according to claim 2, wherein the emulsifying agent (b) belongs to the class of anionic surfactants in acid form.

12. The composition according to claim 3, wherein the emulsifying agent (b) belongs to the class of anionic surfactants in acid form.

13. The composition according to claim 2, wherein the anionic surfactant is selected from the group consisting of mono-and di-esterified phosphoric acids and mixtures thereof.

14. The composition according to claim 3, wherein the anionic surfactant is selected from the group consisting of mono-and di-esterified phosphoric acids and mixtures thereof.

15. The composition according to claim 1, wherein the anionic surfactant is selected from the group consisting of mono-esterified sulfuric acid, di-esterified sulfuric acid, mono-esterified phosphoric acids, di-esterified phosphoric acids, and mixtures thereof.

16. The composition according to claim 1, which is a concentrated emulsifiable composition.

17. A process for producing the composition according to claim 1, comprising mixing:

(a) pelargonic acid and (b) at least one emulsifying agent belonging to the class of anionic surfactants having formula (I)

$$(R—(OCHR_1—CHR_2)_n—(OCHR_3—CHR_4)_m—O—)_q—Z$$

where R is a linear or branched $C_4$-$C_{18}$ alkyl radical, $R_1$, $R_2$, $R_3$ and $R_4$ are independently H or $CH_3$, n and m are identical or different integers from 0 to 30 and at least one of them is not 0, q is 1 or 2, Z represents a sulfate or phosphate group in acid form or a salt thereof, (c) at least one organic solvent, (d) at least one emulsifying agent belonging to the class of non-ionic surfactants.

18. An aqueous emulsion comprising:

the composition according to claim 1, and an aqueous phase.

19. An aqueous emulsion comprising:

0.1-15% by volume, relative to the total volume of the aqueous emulsion, of the composition according to claim 1, and 85-99.9% by volume, relative to the total volume of the aqueous emulsion, of an aqueous phase.

20. A method for protecting a plant from harmful organisms which comprising applying to the plant the aqueous emulsion according to claim 18 as an herbicide.

21. A method for controlling the growth of a plant or parts thereof, which comprises applying the aqueous emulsion according to claim 18 as a plant growth regulator.

22. A method for controlling or suppressing the growth of a plant, said method comprising applying the aqueous emulsion according to claim 18 to the plant.

* * * * *